United States Patent [19]
Kruchowski

[11] 4,083,610
[45] Apr. 11, 1978

[54] BEARING ASSEMBLY UTILIZING A TAPERED BUSHING HOLDER

[76] Inventor: John Kruchowski, 148 W. Park, South St. Paul, Minn. 55075

[21] Appl. No.: 783,814

[22] Filed: Apr. 1, 1977

[51] Int. Cl.² .......................................... F16C 13/00
[52] U.S. Cl. ................................. 305/25; 74/230.3; 308/18; 308/163; 308/237 R; 308/DIG. 8
[58] Field of Search ............... 308/18, 22, 70–71, 308/163, 237, 244, DIG. 8, DIG. 10, 236, 166, 202, 203, 204, 211, 210, 196; 305/21, 23, 26, 28, 25, 11; 74/230.3, 230.4

[56] References Cited
U.S. PATENT DOCUMENTS

| | | | |
|---|---|---|---|
| 2,890,915 | 6/1959 | Benham | 308/237 R X |
| 3,773,393 | 11/1973 | Story et al. | 308/18 X |
| 3,795,428 | 3/1974 | Paine et al. | 308/237 R X |

Primary Examiner—Duane A. Reger
Assistant Examiner—Douglas C. Butler
Attorney, Agent, or Firm—Stuart R. Peterson

[57] ABSTRACT

Each track roller of a crawler has a tapered bore in which is fitted a tapered bushing holder, and fitted within the cylindrical bore of the holder is a cylindrical bushing which journals the roller for rotation about a transverse shaft mounted on the track frame of the crawler. Socket head bolts are threaded into the roller to anchor the holder in place. A thrust washer is carried at each side of the roller which prevents the roller from engaging the track frame, the thrust washers also preventing the entrance of dirt and other foreign matter into the region between the shaft and the encircling bushing.

14 Claims, 6 Drawing Figures

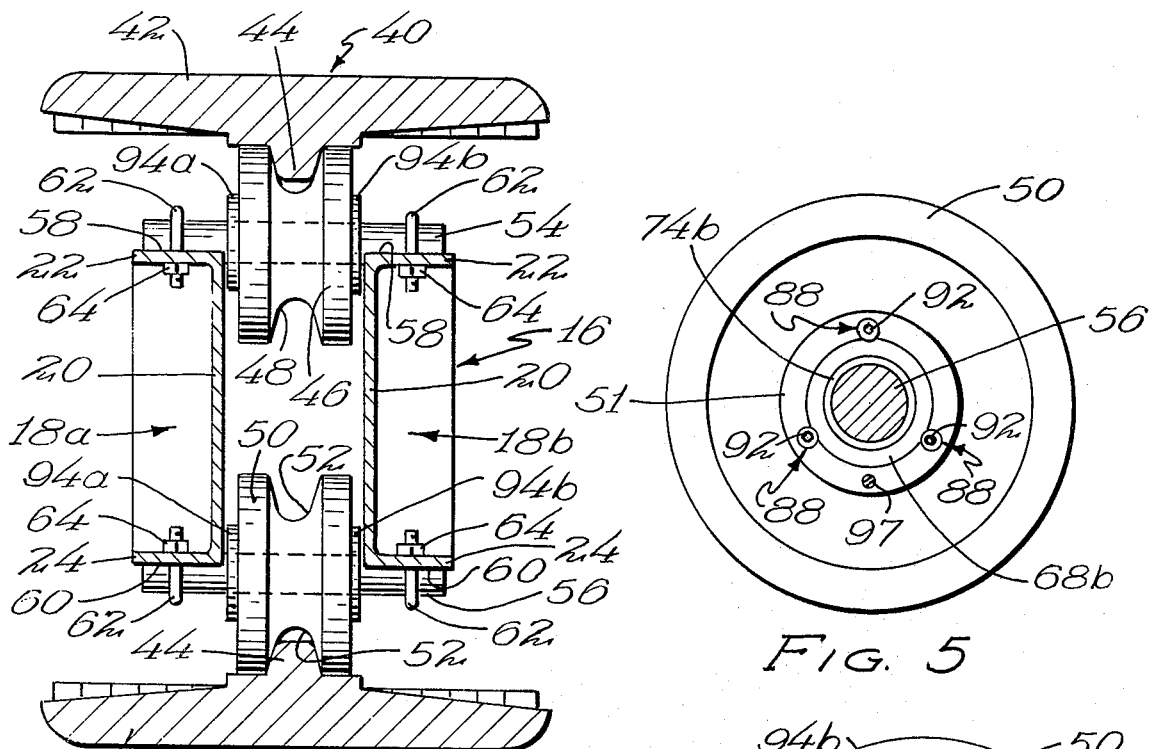
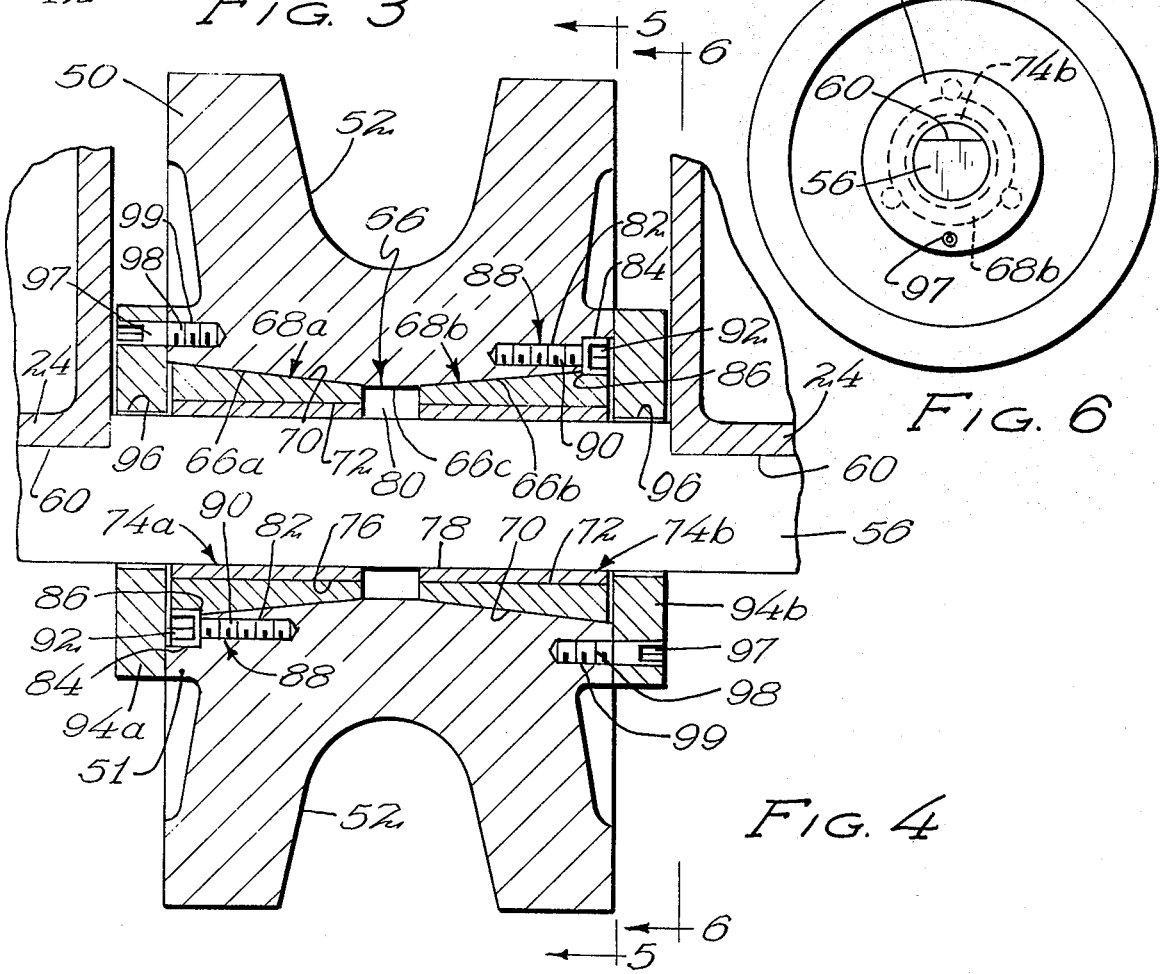

BEARING ASSEMBLY UTILIZING A TAPERED BUSHING HOLDER

BACKGROUND OF THE INVENTION

1. Field of the Invention

This invention relates generally to bearing assemblies utilizing a bushing, and pertains more particularly to a tapered holder for retaining the bushing within the rotatable member.

2. Description of the Prior Art

Extensive use is made of crawlers for supporting and propelling heavy-duty equipment, such as tractors, excavators, cranes, backhoes and drag lines. Conventionally, crawlers of this character include a pair of frame units, each having a driven tumbler at one end and an idler tumbler at the other end about which is entrained an endless track. Mounted to each frame unit between the tumblers are upper and lower rollers. The lower rollers bear against the ground-engaging stretch of endless track as it passes therebeneath to support the vehicle, whereas the upper rollers function mainly to guide the upper stretch of track as it passes thereover.

Although the weight of the vehicle is distributed over a number of lower rollers, each roller still must carry an appreciable load. Also, the sides of both the upper and lower rollers must be prevented from rubbing against the frame unit.

Therefore, it is common practice to use flanged bushings which are press fitted into the roller, the bushings encircling transverse shafts having their ends bolted to the frame unit. Owing to the heavy loads and rocking motion of the vehicle, these bushings wear quite rapidly. This accelerated wear necessitates frequent replacement of the bushings. Also, their flanges are vulnerable to wear because of the constant lateral shifting of the rollers on their respective shafts, thereby causing the flanges to be repeatedly thrust toward the sides of the frame unit. Although the flanges are designed to function as thrust bearings in the space between the roller and the sides of the frame unit, they nonetheless become misshapen and deformed from the constant rubbing that occurs. When the distortion has progressed sufficiently, the roller is prevented from rotating. When this happens, it has been necessary to replace the entire flanged bushing.

The flanged bushings, however, are press fitted into the roller, the press fit usually being on the order of from 0.006 to 0.007 inch. Such a tight fit requires that the removal be done at the shop. To do this, quite obviously, the entire vehicle must be transported, frequently over considerable distances, back to the shop in order to enable the replacement to be made. A considerable saving in time and effort would be effected if the replacement could be satisfactorily performed in the field, that is, at the site where the equipment is being used. Even though the currently used technique has proved extremely expensive, no practical solution to this problem has heretofore been presented to the construction industry.

SUMMARY OF THE INVENTION

Accordingly, one important object of the present invention is to overcome the difficulties and loss of time associated with the replacement of flanged bushings, an aim of the invention being to permit the bushings to be replaced in the field where the equipment is being used. More specifically, it is within the contemplation of my invention to employ a tapered holder for normally maintaining the bushing within the hub of the roller, yet permitting it to be readily removed when it must be replaced. Not only does my invention facilitate the removal of the worn bushing, but it also enables the replacement bushing to be quickly installed. The ease of removal also enables the useful life of the bushings to be extended, for a worn bushing can be removed, turned through, say, 120°, and re-installed.

Inasmuch as bushings employed in the bearing assemblies of crawlers associated with heavy equipment are usually of brass or bronze, another object of my invention is to reduce the amount of this more expensive metal by permitting the employment of a thinner-walled bushing with a bushing holder of less expensive material. Also, since the integral flange on the conventional bushing is eliminated when practicing my invention, an additional saving in material costs can be effected by using a material other than brass or bronze as the thrust element at each side of the roller. In this latter regard, it is planned that a separate thrust washer be used which can be replaced independently of the bushing itself. In other words, it is within the scope of my invention to replace either the bushing or the thrust washer, or both, as conditions warrant.

In addition to saving material an allied object of the invention is to provide a bearing assembly that makes use of a separate thrust washer. Preferably, it is pinned to the roller, and should binding occur, then the pins will shear off so as not to interfere with the roller and its ability to rotate. Thus, the present invention assures continued rotation of each and every roller even when subjected to unusually severe operating conditions. Stated somewhat differently, the need to take the equipment out of service immediately, and the frequency of doing so, for roller repair is appreciably reduced over that required when flanged bushings are used.

A further object of my invention is to modify existing rollers, it only being necessary to rebore the particular roller with an appropriate taper so that the tapered bushing can be fitted in the tapered bore with the cylindrical brass or bronze bushing in turn fitted within the cylindrical bore of the bushing holder.

Yet another object is to make use of two shorter bushings, each held in place by a tapered bushing holder. In other words, when utilizing the teachings of my invention, the bushing need not extend completely through the bore, that is from one side of the roller to the other, but can extend in each instance to a point substantially midway between the sides of the roller, thereby providing an interior space or void which can contain some of the lubricant so that the two shorter bushings are lubricated as they rotate on their shaft. However, the bore can taper in only one direction from one side of the roller to the other side thereof, and then a bushing of the same length as currently employed would be used in combination with just one tapered bushing holder of the same length.

Another object is to permit bushings of conventional wall thicknesses to be used or bushings having thinner walls to be employed, thereby permitting the owner of the equipment to decide on the type of bushing to be used. In this regard, if a thinner bushing is employed, then the bushing holder can be thicker; by the same token, if a thicker bushing is employed, then a thinner bushing holder can be used.

Briefly, my invention envisages a rotatable member having a tapered bore formed therein so that a cylindrical bushing can be press fitted into the cylindrical bore of the holder, and the holder, by virtue of its tapered outer surface, easily inserted into the tapered bore of the rotatable member. Special bolt means are utilized for anchoring the bushing holder to the rotatable member. The tapered bore of the rotatable member can taper inwardly from just one side or can taper inwardly from both sides. In the latter situation, two shorter bushings are utilized with a holder for each bushing. The invention also permits the use of separate and distinct thrust washers rather than integral flanges on the bushings as heretofore employed. Consequently, the thrust washers can be replaced without replacing the bushings and vice versa. Whatever replacement is needed can be accomplished in the field, thereby avoiding the necessity for returning the equipment to the shop.

BRIEF DESCRIPTION OF THE DRAWINGS

FIG. 3 is a sectional view taken in the direction of line 3—3 of FIG. 2 through the endless track and frame unit of FIG. 2 for the purpose of illustrating the manner in which the upper and lower rollers are rotatably mounted;

FIG. 4 is a sectional view through the lower roller of FIG. 3 for the purpose of showing my tapered bushing holder;

FIG. 5 is a side elevational view taken in the direction of line 5—5 of FIG. 4, and FIG. 6 is a side elevational view taken in the direction of line 6—6 of FIG. 4.

DESCRIPTION OF THE PREFERRED EMBODIMENT

Figure 1:
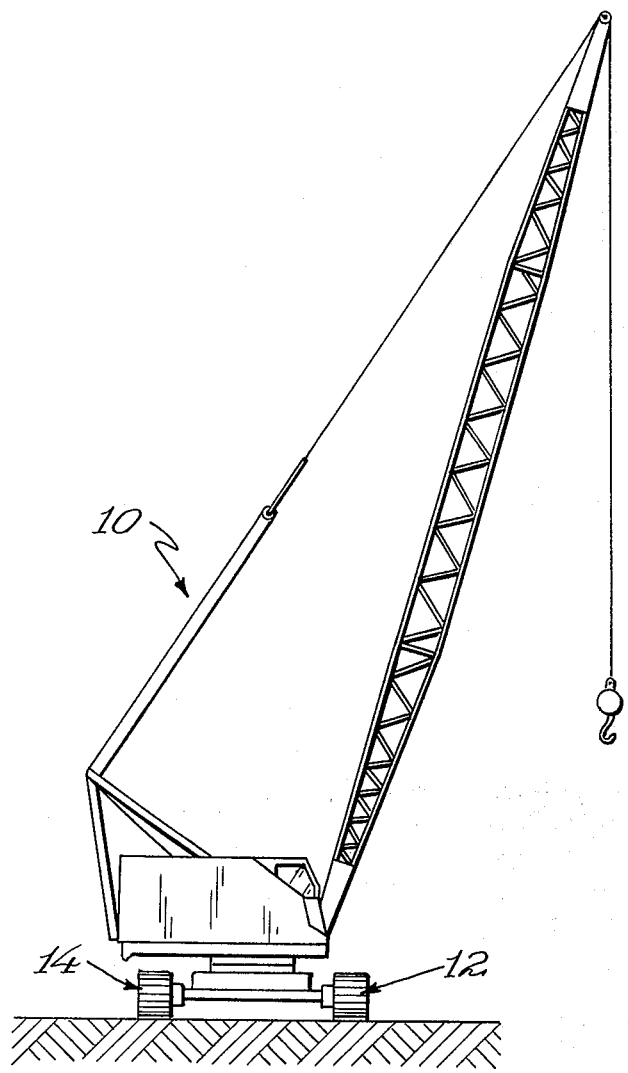
FIG. 1 is an elevational view of a crane incorporating my invention therein.

Although my invention is susceptible to use with various types of vehicles, such as tractors and miscellaneous earth moving equipment, the crane denoted generally by the reference numeral 10 in FIG. 1 will serve as a suitable illustration of where my invention will find utility. The crane 10 includes a pair of identical crawlers 12 and 14. Other than the modification made to the crawlers 12 and 14 for the purpose of exemplifying my invention, the crawlers 12, 14 are of conventional construction.

Describing the crawler 12, although as pointed out above it is identical to the crawler 14, it will be discerned that it comprises a track frame unit 16 which includes inboard channel-shaped side beams 18a and 18b, respectively, each beam having a vertical web 20, an upper flange 22 and lower flange 24. Although not illustrated, the beams 18a, 18b are maintained in a spaced parallel relationship by various cross struts. In other words, the frame unit 16 constitutes a rigid structure, as is conventional.

Extending through the frame unit 16 is a drive shaft 26 which is powered by a hydraulic motor (not shown) mounted to the inboard beam 18a. The drive shaft 26 has been sectioned in substantially the plane in which the web 20 of the outboard beam 18b resides. Therefore, the sprocket on the nearer end of the drive shaft 26 does not appear in FIG. 2. However, it will be understood that a chain (not shown) extends from a sprocket (not shown) on the drive shaft 26 to a larger sprocket (also not shown) on the end of a driven axle 28, the section being taken in the same plane for both the shaft 26 and the axle 28. However, a driven tumbler labeled 30 keyed to the axle 28 does appear in FIG. 2. Whereas the driven axle 28 and the driven tumbler 30 are at one end of the frame unit 16, an idler axle 32 and an idler tumbler 34 are located at the opposite end of the unit 16. The idler axle 32 is actually journaled in bearing blocks 36 longitudinally movable through the agency of an adjusting mechanism 38 so that the tension on an endless track labeled 40 can be varied, all in a conventional fashion.

The endless track 40, composed of a number of link pins 41 which articulatively connect track links or pads 42, is entrained about the tumblers 30, 34. Each shoe or pad 42 is formed with a tracking rib 44 (FIG. 3).

Figure 2:
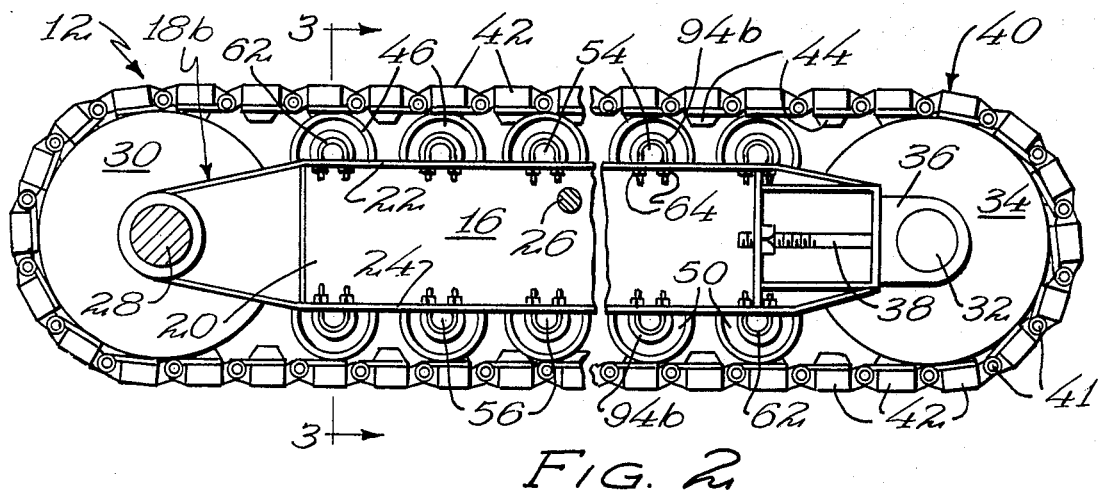
FIG. 2 is an enlarged side elevational view of one of the crawlers of FIG. 1, a central portion having been removed in order to permit use of a larger scale.

As can be seen from FIG. 2, there is a plurality of upper track rollers 46, and from FIG. 3 it will be understood that each track roller 46 has a groove 48 for receiving therein the various tracking ribs 44 on the pads 42. In addition there is a plurality of lower track rollers 50. Each roller 46 and 50 has a hub 51 at each side. As with the rollers 46, the rollers accommodate the various tracking ribs 44.

The rollers 46 are rotatably mounted or journaled on transverse shafts 54, whereas the rollers 50 are similarly mounted on lower shafts 56. The upper shafts 54 have their end portions milled so as to form flats at 58; likewise, the end portions of the lower shafts are milled to form flats at 60. Anchoring the end portions to the upper and lower flanges 22 and 24 of the beams 18a and 18b are conventional U-bolts 62, the legs of which extend through holes formed in these flanges. Nuts 64 when tightened hold the flats 58 and 60 tightly against the flanges 22 and 24, respectively, and thus prevent any movement of the shafts 54 and 56 relative to the frame unit 16. Here again, the mode of anchoring the shafts 54 and 56 is conventional.

While FIG. 3 is a sectional view taken through the track 40, more specifically through the shoes or pads 42 which are passing over one of the upper rollers 46 and beneath one of the lower rollers 50, as well as through the beams 18a and 18b, the scale of FIG. 3 does not lend itself readily to sectionalizing the rollers 46 and 50. However, in FIG. 4, which is on a larger scale than FIG. 3, the lower roller 50 has been sectioned, the section being in the same vertical plane as denoted by line 3—3 in FIG. 2. Therefore, from FIG. 4, it will be perceived that the particular roller 50, as are the other lower rollers 50 and the upper rollers 46, is formed with a bore 66. More specifically, the bore 66 is formed with tapered bore portions 66a and 66b, the bore portions 66a, 66b tapering inwardly from opposite sides or faces of the roller 50 (and each of the other rollers, too). As shown in FIG. 4, the tapered portions 66a, 66b do not meet but form a small cylindrical central portion 66c.

Within the tapered bore portion 66a is received a bushing holder 68a and within the tapered bore portion 66b is similarly received a second bushing holder 68b. Each bushing holder 68a, 68b has an outer tapered surface 70 and a cylindrical bore 72. It will be appreciated from FIG. 4 that the taper imparted to the bore portions 66a and 66b conforms to the taper on the bushing holders 68a and 68b. The specific degree of taper is not critical to a practicing of the invention; however, it is important that the taper for the bore portion 66a correspond generally to that for the outer surface 70 on the holder 68a, and the same thing holds true for the taper imparted to the bore portion 66b and for the surface 70 on the holder 68b.

Attention is now directed to a pair of cylindrical bushings 74a, 74b. These bushings 74a, 74b have the same wall thickness throughout, thereby forming a cylindrical outer surface 76 and a cylindrical bore 78.

At this stage of the description, it should be made clear that the bushings 74a and 74b are of brass or bronze. Flanged bushings in the past have been made of the same metal. However, an advantage as far as the instant invention is concerned is that the bushing holders 68a, 68b do not have to be of the same material as the bushings 74a, 74b. Hence, not only can the bushings 74a, 74b be thinner, thereby reducing the amount of more expensive metal, but the bushing holders 68a, 68b can be of a decidedly less costly material, such as aluminum, stainless steel or a structural plastic, such as fiberglass.

It will be appreciated that the bushing 74a is press fitted into the bushing holder 68a and the bushing 74b is press fitted into the bushing holder 68b. The press fit is on the order of from 0.006 to 0.007 inch. In other words, initially the cylindrical surface 76 is from 0.006 to 0.007 inch larger than the diameter of the bore 72. Of course, the cylindrical bore 78 has a diameter such as to freely encircle the shaft 56 with which it is associated. Consequently, the various rollers 46 and 50 are free to rotate on the various shafts 54 and 56.

Although not of major significance, it should be noted that a central void or space 80 is provided in the illustrated embodiment, the space or void 80 being formed by the lack of an abutting relationship between the inner ends of the holders 68a, 68b and the inner ends of the bushings 74a, 74b contained therein. The space or void 80 can store a supply of grease for lubricating the bearing assembly in a manner corresponding to the way it has been customarily done.

At this point it will be observed from FIG. 4 that the roller 50 has a tapped hole 82 (actually three) extending inwardly from each side, the holes 82 being countersunk at 84. While most of the countersinking 84 is in the roller 50, the countersinking is located so that a segmental portion thereof extends into the bushing holder 68a at one side of the roller and into the bushing holder 68b at the other side to form a ledge or shoulder 86. A corresponding number of bolts 88 having shanks 90 and socket heads 92 are threaded into the three tapped holes 82 so that a segmental portion of each head 92 bears against a ledge 86. Not only does this arrangement assure that the bushing holders 66a, 66b will be retained within the roller 50, but as the description progresses it will be seen that the bolt arrangement helps in inserting the bushing holders 68a, 68b (and the bushings 74a, 74b fitted therein).

At this time, reference will be made to two thrust washers 94a and 94b. Actually, these washers 94a, 94b have holes or openings 96 therein, providing a small amount of clearance with respect to the shaft 56. The various thrust washers 94a, 94b, there being two for each roller 46 and two for each roller 50, are anchored to the rollers 46 and 50 by reason of dowel pins 97 that extend through the washers 94a, 94b into the roller, each dowel pin 97 having a threaded shank 98 that is engaged with a tapped hole 99 located in the hub 51. From FIG. 4 it will be seen that the two thrust washers 94a, 94b move in unison with the roller 50 owing to the dowel pins 97, doing so in the space or clearance between the hubs 51 of the roller 50 and the webs 20 of the side beams 18a and 18b. Should any binding occur, such as from undue distortion or deformation of either thrust washer 94a or 94b, then the roller 50 will still rotate. This is because the dowel pin 97 will merely shear off, thereby enabling the thrust washer 94a or 94b, as the case may be, to continue rotating. While the continued wear of either thrust washer 94a or 94b might very well warrant a change of thrust washers, any change can usually be postponed until a more convenient time. In other words, the equipment need not be taken immediately out of service which is a decided advantage.

In order to fully appreciate the benefits to be derived from a practicing of my invention, a brief explanation of the installation and removal procedures involving the bushing holders 68a and 68b will now be given. Assuming that the crane 10 has originally been equipped with conventional flanged brass or bronze bushings, these bushings must first be removed at the shop. This is necessary in order to modify the various rollers 46 and 50, more specifically providing the tapered bore 66 which is composed of the tapered portions 66a and 66b in the exemplary situation. In boring the roller 50, for instance, it is bored with a tapered wall complementing the taper of the surface 70 on the particular bushing holder or holders 68a, 68b to be inserted therein. Since the degree of taper is not critical, the bushing holders 68a, 68b can be initially formed with the appropriate tapered surface 70 and then the tapered portions 66a, 66b formed as just mentioned, or the tapered portions 66a, 66b can be first formed. The taper, it should be understood, provides a greatly facilitated installation and removal.

As already explained, the bores 66 of the rollers 46 and 50 may be tapered throughout their entire length, that is from one side to the other, or as illustrated, each bore portion 66a, 66b can be somewhat less than half the length of the bore.

In the pictured situation, the void or space 80 accommodates a quantity of bearing grease and affords an improved lubrication of the bushings 74a, 74b as they rotate on the shaft 56, the shafts 56 being the lower shafts. However, the bearing arrangement for the lower rollers 50, as depicted in FIG. 4, is also utilized in the upper rollers 46 which, of course, rotate on the shafts 54.

An interference fit of from 0.006 to 0.007 inch has already been mentioned. In this regard, the particular bushing 74a is forced into the bushing holder 68a and the bushing 74b is similarly press fitted into the bushing holder 68b. This is done in the shop. The members 68a, 74a and the members 68b and 74b, owing to their respective press fits, become individual units and are subsequently handled as such. By virtue of the tapered surfaces 70 on the holders 68a and 68b, which taper complements the taper of the bore portions 66a, 66b, the bushing holders 68a and 68b, together with the bushings 74a, 74b now contained therein, are forced inwardly from opposite sides of the roller 50 into the bore portions 66a and 66b.

Usually, it will be better to form the countersunk recesses 84 in the hubs 51 of the roller 50 prior to urging the particular bushing holders 68a and 68b into the tapered bore portions 66a and 66b. If this is done first and also the ledges 86 formed prior to the installation of the holders 68a and 68b, then the tapped holes 82 can be made use of for the purpose of completing the insertion, the bolts 88 actually pulling the holders 68a and 68b into the bore portions 66a and 66b by the heads 92 bearing against the ledges 86. On the other hand, a gentle tapping or pounding will effect the insertion and then the holes 82 can be tapped and then countersunk at 84 so that the bolts 88 then keep the holders 68a and 68b from rotating within the roller 50. Of course, when any replacement is subsequently attempted, the ledges 86 will enable the bolts 88 to pull in the bushing holders 68a, 68b.

After performing the above procedure, the roller 50 is ready to have attached thereto the two thrust washers 94a, 94b. The holes or openings 96 in the thrust washers 94a, 94b should be concentric with the cylindrical bores 78 in the bushings 74a, 74b, true concentricity not being necessary, however, inasmuch as the holes 96 should be larger than the shaft 56. When the thrust washer 94b, say, confronts one side of the roller 50, a hole can be drilled and tapped through this thrust washer into the hub 51 of the roller 50 at this side, the portion in the hub 51 tapped at 99, and the dowel pin 97 screwed into the hole 99, as is believed evident from FIG. 4. The same technique is used in attaching the thrust washer 94a to the other side of the roller 50.

With the foregoing completed, then the bearing assembly is placed over the shaft 56 and the end portions having the flats 60 thereon are placed against the undersides of the lower flanges 24. The lower flanges 24 have holes for the accommodation of the U-bolts 62 so the bolts 62 are then inserted upwardly into the holes and the nuts 64 tightened thereon to anchor the shaft 56 in place.

In operation, the roller 50 in FIG. 4, as with the other rollers 50 and 46 are all free to rotate on their respective shafts 56 and 54. When maneuvering the crane 10 through various angles and also over different types of sloping terrain, considerable thrust forces exist. The function of the thrust washers 94a, 94b is to prevent the rollers 46 and 50 from shifting against portions of the frame unit 16, more specifically against the webs 20 of the side beams 18a and 18b. The friction and resulting heat will frequently distort or deform the integral flanges on the bushings that have been employed in the past. While the same friction and heat can develop when using the separate thrust washers 94a, 94b in contradistinction to the prior art integral flanges, the rollers 46 and 50 are never prevented from rotating on their respective shafts 54 and 56, for the threaded dowel pins 97 will shear before any such happening occurs.

Although the tapered boring of the rollers 46 and 50 in accordance with the teachings of my invention will be performed in the shop, any replacement thereafter of the members 68a, 74a and 68b, 74b can readily be performed in the field. Later removal of any of the bushing holders 68a and 68b (and the bushings 74a and 74b press fitted therein) in the field can be accomplished by first digging a pit or trench. The vehicle, in the illustrated instance the crane 10, is next maneuvered into position so that the crawler 12 spans the trench or pit. More specifically, the particular roller 50 that has become impaired and which requires its bushing holder (or holders) and bushing (or bushings) to be removed is located preferably directly over the center of the pit. The frame unit 16 can be jacked up to relieve the lower stretch of the endless track 40 from having any weight imposed thereon. The removal of a pin 41 will permit the track 40 to be separated and thus allow dropping the roller shaft 56 below the frame unit 16, more specifically the lower flanges 24 of the side beams 18a, 18b.

The U-bolts 62 are then taken out by loosening the nuts 64, the shaft 56 being easily slid from the bushings 74a, 74b. The bushing holders 68a, 68b can be forced from the tapered portions 66a, 66b. Owing to the complemental taper imparted to the bore portions 66a, 66b and that of the outer surfaces 70 on the bushing holders 68a and 68b, only a slight outward urging is required to release the holders 68a, 68b. A tool can be inserted through the cylindrical bore 78 of either bushing 74a or 74b so as to force out one or the other of the bushings 74a or 74b, this being done from one side of the roller 50. Then the tool can be inserted from the other side to dislodge the other bushing holder and its bushing.

Once the bushing holders 68a, 68b are removed, then replacement bearing holders are fitted into the same roller 50. As already explained, the bolts 88 can be made use of to pull the holders 68a, 68b, together with the bushings 74a, 74b press fitted therein, into the roller 50.

It is then that the shaft 56 is reinserted through the bushings 74a, 74b. Next, the thrust washers 94a, 94b, which are usually new, are installed, the dowel pins 97 being used to prevent relative rotation of the thrust washers 94a, 94b relative to the roller 50. As already explained, should there be any binding, the pins 97 will shear so as to permit either thrust washer 94a, 94b to rotate freely on the shaft 56.

With the shaft 56 within the bushings 74a and 74b, the shaft 56 is again bolted to the underside of the side beams 18a and 18b, more specifically to the lower flanges 24.

The previously removed pin 41 in the endless track 40 can then be replaced and, if need be, the mechanism 38 adjusted so as to provide the proper amount of track tension.

Inasmuch as an important factor contributing to the wear of the bores 78 of the bushings 74a, 74b is caused by the severe rocking action, turning the bushing holders 68a, 68b through an angle of 120° will prolong the life of a given bushing. The removal procedure already described is the same when angular shifting is to be employed. Instead of installing replacement holders, in the same manner the old holder is re-used but inserted at a different angle. This procedure can result in a substantial saving.

I claim:

1. A bearing assembly for use with a cylindrical shaft comprising a member to be journaled for rotation on said shaft, said member having a tapered bore extending inwardly from one side thereof, a bushing holder received in said tapered bore having a tapered outer surface the taper of which corresponds generally to that of said tapered bore and having a cylindrical bore, and a bushing received in said cylindrical bore having a cylindrical outer surface the diameter of which corresponds generally to that of said cylindrical bore and having a cylindrical bore the diameter of which is such as to permit relative rotation of said bushing and said shaft.

2. A bearing assembly in accordance with claim 1 in which said bushing is of one material and said bushing holder is of a second material.

3. A bearing assembly in accordance with claim 2 in which said one material is of brass or bronze.

4. A bearing assembly in accordance with claim 3 in which said second material is aluminum, steel or fiberglass.

5. A bearing assembly in accordance with claim 1 in which the diameter of the cylindrical bore in said bushing holder is initially slightly less than the diameter of the outer cylindrical surface of said bushing to provide a press fit between said bushing holder and said bushing.

6. A bearing assembly in accordance with claim 5 including bolt means extending into said member having a head engaging both said member and said bushing holder.

7. A bearing assembly in accordance with claim 6 in which said head is recessed into said member and into said bushing holder.

8. A bearing assembly in accordance with claim 1 in which one end of said bushing holder and one end of said bushing are substantially coplanar with said one side of said member, and a thrust washer confronting said one side of said member.

9. A bearing assembly in accordance with claim 8 including at least one dowel pin extending through said thrust washer into said member.

10. A bearing assembly in accordance with claim 1 in which said tapered bore includes two tapered portions, one tapered portion extending inwardly from said one side of said member and the other tapered portion extending inwardly from the other side of said member, said bushing holder being received in said one tapered portion, a second bushing holder received in said other tapered portion, and a second bushing received in said second bushing holder.

11. In a crawler including a frame unit, a tumbler adjacent each end of said frame unit, an endless track entrained about said tumblers, a plurality of transverse shafts, means anchoring the end of each shaft to the lower side of said frame unit, a roller member for each shaft, and a cylindrical bushing within each roller member encircling one of said shafts, the improvement comprising a tapered bushing holder between each roller member and each bushing.

12. A crawler in accordance with claim 11 in which said cylindrical bushing is press fitted into said tapered bushing holder.

13. A crawler in accordance with claim 12 including a pair of thrust washers for each roller member, one thrust washer being disposed between one side of the roller member with which it is associated and a portion of said frame unit, and the other of each pair of thrust washers being disposed between the other side of the roller member with which it is associated and another portion of said frame unit.

14. A crawler in accordance with claim 13 including a pair of dowel pins for each thrust washer, each pair of dowel pins extending through its particular thrust washer into the roller member with which they are associated.

* * * * *